US010043002B2

(12) United States Patent
Shah

(10) Patent No.: US 10,043,002 B2
(45) Date of Patent: Aug. 7, 2018

(54) OPTIMIZATION OF SERVICE IN-LINE CHAIN TRAFFIC

(71) Applicant: Big Switch Networks, Inc, Santa Clara, CA (US)

(72) Inventor: Sandip Shah, Milpitas, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 153 days.

(21) Appl. No.: 15/081,201

(22) Filed: Mar. 25, 2016

(65) Prior Publication Data

US 2016/0285973 A1 Sep. 29, 2016

Related U.S. Application Data

(60) Provisional application No. 62/139,333, filed on Mar. 27, 2015.

(51) Int. Cl.
  *G06F 15/16* (2006.01)
  *G06F 21/55* (2013.01)
  (Continued)

(52) U.S. Cl.
  CPC .......... *G06F 21/55* (2013.01); *H04L 45/306* (2013.01); *H04L 47/10* (2013.01); *H04L 63/00* (2013.01);
  (Continued)

(58) Field of Classification Search
  CPC ....... G06F 21/55; H04L 45/306; H04L 47/10; H04L 63/00; H04L 63/0209; H04L 45/7457; H04L 63/1441
  See application file for complete search history.

(56) References Cited

U.S. PATENT DOCUMENTS 7,889,748 B1  2/2011  Leong et al.
2011/0116378 A1*  5/2011  Ramankutty ........... H04L 12/66
  370/235
(Continued)

FOREIGN PATENT DOCUMENTS

WO  WO-2016160554 A1  10/2016

OTHER PUBLICATIONS

"International Application Serial No. PCT/US2016/024180, International Search Report dated Jun. 20, 2016", 2 pgs.
(Continued)

*Primary Examiner* — Ryan Jakovac
(74) *Attorney, Agent, or Firm* — Schwegman Lundberg & Woessner, P.A.

(57) ABSTRACT

Systems and methods to optimize processing of service in-line chain traffic are described. The system generates a program comprised of a first plurality of instructions, the first plurality of instructions being utilized to process traffic information that is being received from a first network and communicated to a second network. The traffic information including a plurality of flows of traffic information that is associated with a plurality of in-line services that is associated with a plurality of in-line service systems that are logically interposed between the first network and the second network with a ternary content-addressable memory (TCAM) that executes the plurality of instructions to forward the plurality of flows of traffic information. Next the system executes the first plurality of instructions with the TCAM.

11 Claims, 19 Drawing Sheets

(51) Int. Cl.
*H04L 29/06* (2006.01)
*H04L 12/801* (2013.01)
*H04L 12/725* (2013.01)
*H04L 12/743* (2013.01)

(52) U.S. Cl.
CPC ...... *H04L 63/0209* (2013.01); *H04L 45/7457* (2013.01); *H04L 63/1441* (2013.01)

(56) References Cited

U.S. PATENT DOCUMENTS

| | | |
|---|---|---|
| 2012/0113857 A1 | 5/2012 | Narayanaswamy et al. |
| 2013/0117621 A1 | 5/2013 | Saraiya et al. |
| 2013/0272305 A1 | 10/2013 | Lefebvre et al. |
| 2014/0283041 A1 | 9/2014 | Cao et al. |
| 2015/0358290 A1* | 12/2015 | Jain .................... H04L 63/0263 711/108 |

OTHER PUBLICATIONS

"International Application Serial No. PCT/US2016/024180, Written Opinion dated Jun. 20, 2016", 12 pgs.
"International Application Serial No. PCT/US2016/024180, International Preliminary Report on Patentability dated Oct. 12, 2017", 14 pgs.

\* cited by examiner

TERNARY CONTENT-ADDRESSABLE MEMORY
(TCAM) — 306

| MATCH | ACTION (FORWARDING PATH) |
|---|---|
| 1, "IS A" MATCH – SRC IP 1.1.1.1 | A (PRIO-4) |
| 1, "IS B" MATCH – DST IP 1.1.1.1 | B (PRIO-3) |
| 1, "IS C" MATCH – HTTP | C (PRIO-2) |
| 1, * | D (PRIO-1) |
| 2, "IS B" MATCH – DST IP 1.1.1.1 | E (PRIO-4) |
| 2, "IS C" MATCH – HTTP | F (PRIO-3) |
| 2, * | G (PRIO-2) |
| 3, "IS C" MATCH – HTTP | H (PRIO-4) |
| 3, * | I (PRIO-3) |
| 4, * | J (PRIO-4) |

TERNARY CONTENT-ADDRESSABLE MEMORY (TCAM) — 306

| MATCH | ACTION (FORWARDING PATH) |
|---|---|
| 1, "IS A" MATCH – SRC IP 1.1.1.1 | A (PRIO-4) |
| 1, "IS B" MATCH – ALL | B (PRIO-3) |
| ~~1, "IS C" MATCH – HTTP~~ | ~~C (PRIO-2)~~ |
| ~~1, *~~ | ~~D (PRIO-1)~~ |
| 2, "IS B" MATCH – ALL | E (PRIO-4) |
| ~~2, "IS C" MATCH – HTTP~~ | ~~F (PRIO-3)~~ |
| ~~2, *~~ | ~~G (PRIO-2)~~ |
| 3, "IS C" MATCH – HTTP | H (PRIO-4) |
| 3, * | I (PRIO-3) |
| 4, * | J (PRIO-4) |

TERNARY CONTENT-ADDRESSABLE MEMORY (TCAM) — 306

| | MATCH | ACTION (FORWARDING PATH) |
|---|---|---|
| + | 1, "IS A" MATCH – SRC IP 1.1.1.1, HTTP | A + X (PRIO-6) |
|   | 1, "IS A" MATCH – SRC IP 1.1.1.1 | A (PRIO-5) |
| + | 1, "IS B" MATCH – DST IP 1.1.1.1, HTTP | B + X (PRIO-4) |
|   | 1, "IS B" MATCH – DST IP 1.1.1.1 | B (PRIO-3) |
| + | 1, "IS C" MATCH – HTTP | C + X (PRIO-2) |
|   | 1, * | D (PRIO-1) |
|   | 2, "IS B" MATCH – DST IP 1.1.1.1 | E |
|   | 2, "IS C" MATCH – HTTP | F (PRIO-4) |
|   | 2, * | G (PRIO-3) |
|   | 3, "IS C" MATCH – HTTP | H (PRIO-4) |
|   | 3, * | I (PRIO-3) |
|   | 4, * | J (PRIO-4) |

```
AddFlowMods(boolean isChain, serviceSeq, Chain)
{
    set input port
    prio = high
    ALL-match = false
    For each of the remaining services sorted by sequence
        If (input-port is of the service and match of current service
           does not intersect with this iterated service)
                skip;
        Add flow:
                Match (input-port + what this service wants) with prio.
                Action is output to this service.
        Decrement prio
        if (match == ALL) {
                ALL-match = true;
                break;
        }
        If (All-match == false) {
                Add a match with just input port
        }
}

AddFlowMods(true, 0, chain)
Repeat for each of the services: AddFlowMods(false, 1..n, chain)
```

OPTIMIZATION OF SERVICE IN-LINE CHAIN TRAFFIC

RELATED APPLICATION

This application claims the priority benefit of U.S. Provisional Application No. 62/139,333, filed on Mar. 27, 2015, which is hereby incorporated by reference in its entirety.

TECHNICAL FIELD

This disclosure relates to the technical field of data communications. More particularly, systems and methods to optimize processing of in-line service chain traffic.

BACKGROUND

A production network may interconnect multiple devices and operate by utilizing multiple technologies. A production network often includes service chain traffic that is typically processed in a serial manner.

BRIEF DESCRIPTION OF THE DRAWINGS

FIG. 5 is a block diagram illustrating a routine in-line service chain TCAM program, according to example embodiments;

FIG. 7 is a block diagram illustrating an optimized TCAM program, according to example embodiments;

FIG. 10 is a block diagram illustrating an optimized TCAM program, according to example embodiments;

FIG. 11 is pseudo code for a method to optimize processing of service in-line chain traffic, according to some example embodiments;

DETAILED DESCRIPTION

Figure 1:
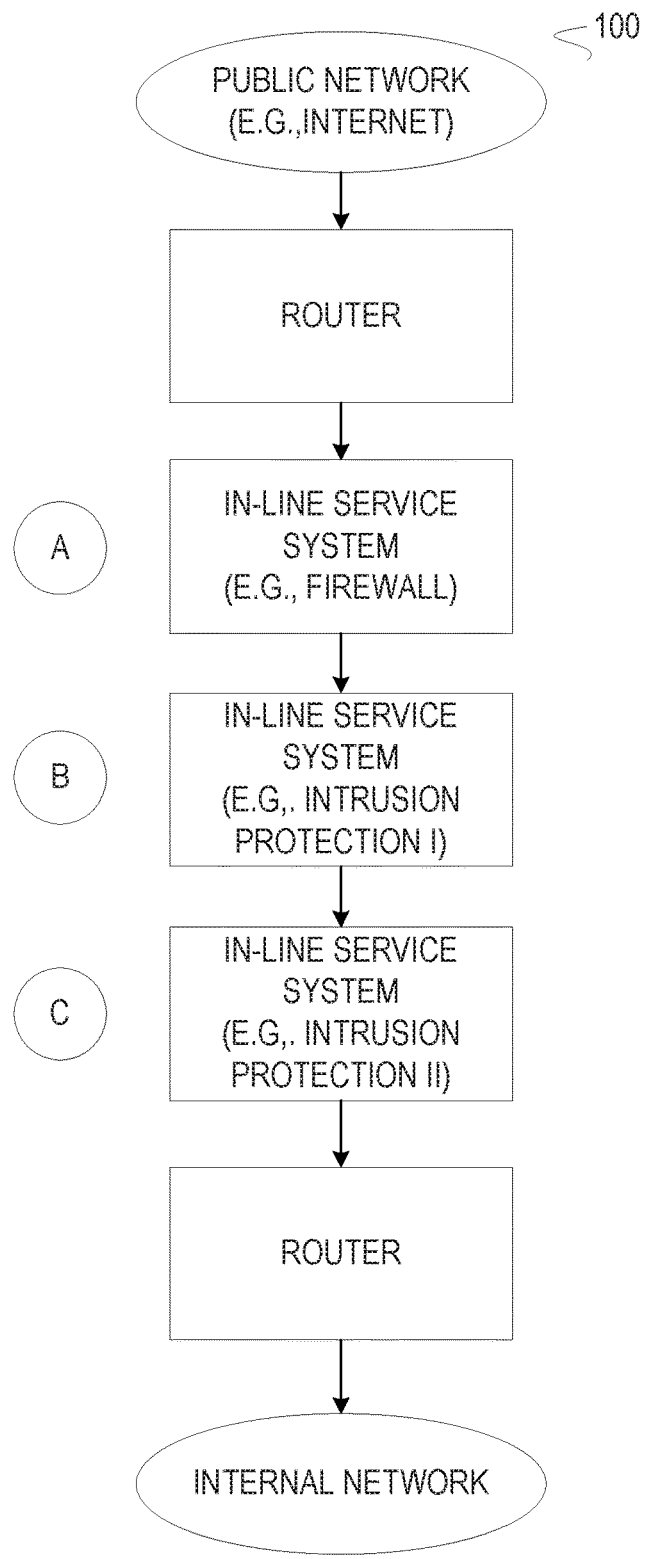
FIG. 1 is a block diagram illustrating a prior art system, according to example embodiments, to process traffic information with a service chain.

FIG. 1 is a block diagram illustrating a system 100, according to an embodiment, to process traffic information with a service chain. The system 100 is found in the prior art and is associated with deficiencies. The system 100 may include a router that receives traffic information (e.g., packets, frames) from a public network (e.g., Internet) and communicates the traffic information over communication links connecting three in-line service systems (e.g., "A," "B" and "C") that serially process the traffic information before communicating the traffic information over a communication link to a second router that, in turn, communicates the traffic information over a communication link to an internal network. The in-line service systems may respectively perform services on the traffic information before the traffic information is delivered to the internal network. For example, the in-line service system "A" may be embodied as a firewall system that blocks unauthorized access and allows authorized access. Further for example, the in-line service systems "B" and "C" may be embodied as intrusion protection systems that monitor network and/or system activities for different types of malicious activities. The system 100 exhibits the following deficiencies: 1) failure of one in-line service system causes a disruption of service for the internal network; 2) addition of a new in-line service system causes a temporary loss of service; and 3) all traffic information is communicated through each of the service systems though any particular service system may process only a portion of the traffic. The system 100 may connect any two networks, according to example embodiments. The system 100 may include a lesser or greater number of in-line service systems.

Figure 2:
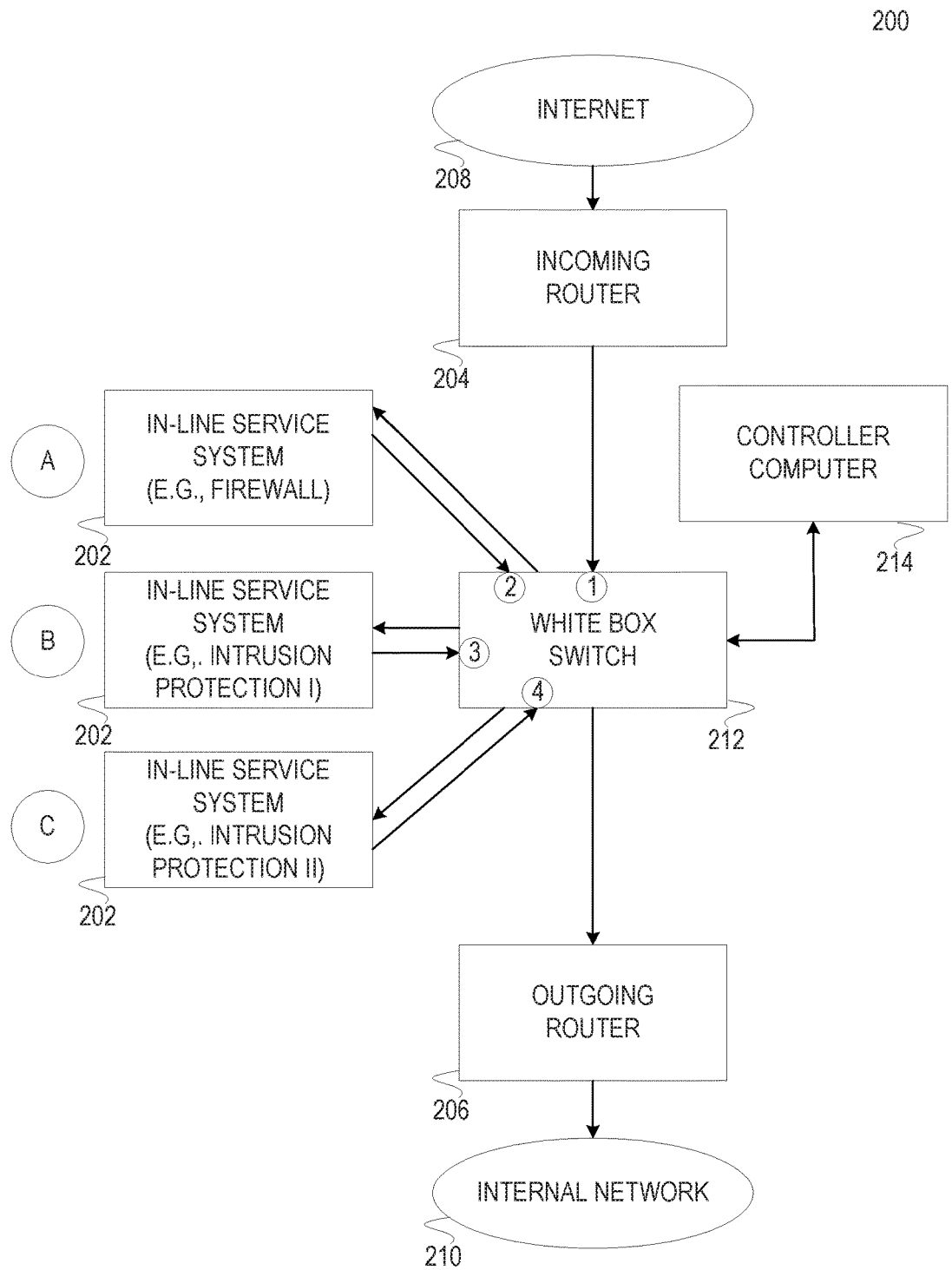
FIG. 2 is a block diagram illustrating a system, according to example embodiments, to optimize processing of in-line service chain traffic.

FIG. 2 is a block diagram illustrating a system 200 to optimize processing of in-line service chain traffic, according to example embodiments. As in system 100, the system 200 includes three in-line service systems 202 (e.g., "A," "B" and "C") and two routers including an incoming router 204, utilized for connecting the in-line service systems 202 with the Internet 208, and an outgoing router 206, utilized for connecting the in-line service systems 202 with an internal network 210. Other embodiments may include a lesser or greater number of in-line-service systems 202 for connecting the same or other types of networks. Further, the traffic information is illustrated and described as flowing from North (e.g., top of the page) to South (e.g., bottom of the page), however, the operations described below may also be performed on traffic information flowing from South to North. The system 200 further includes a white box switch 212 that is connected by communication links to both of the routers, the three in-line service systems 202, and a controller computer 214 that is utilized to program the white box switch 212 to forward the traffic information. For example, the white box switch 212 may receive the traffic information from the incoming router 204 on a port one (e.g., "1") and forward the traffic information to the in-line service system 202 "A" that, in turn, processes the traffic information and forwards the traffic information back to the white box switch 212 on port two (e.g., "2") that, in turn, processes the traffic information and forwards the traffic information to the in-line service system 202 "B" that, in turn, processes the traffic information and forwards the traffic information back to the white box switch 212 on port three (e.g., "3") that, in turn, processes the traffic information and forwards the traffic information to the in-line service system 202 "C" that, in turn, processes the traffic information and forwards the traffic information back to the white box switch 212 on port four (e.g., "4") that, in turn, forwards the traffic information to the outgoing router 206 connected to the internal network 210. Accordingly, the traffic information received from the incoming router 204, connected to the Internet 208, may snake in and out of each of the respective in-line service systems 202 "A," "B" and "C" before being communicated to the outgoing router 206 connected to the internal network 210. The system 200 differs from the system 100 in that the white box switch 212 selectively forwards the traffic information to each of the in-line service systems 202. For example, the white box switch 212 selectively forwards a first portion of the traffic information from the incoming router 204 to the in-line service system 202 "A." Further for example, the white box switch 212 selectively forwards a second portion of the traffic information from the incoming router 204 to the in-line service system 202 "B" and likewise for in-line service system 202 "C," as described further below.

Figure 3A:
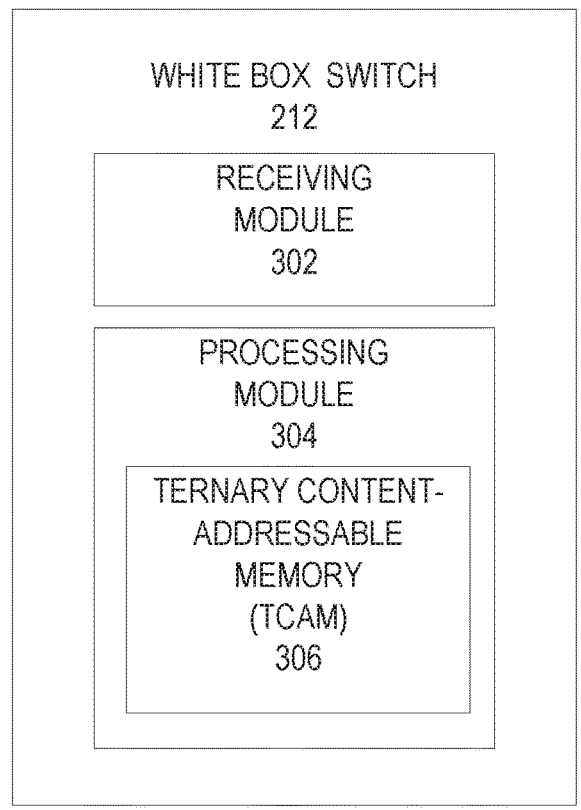
FIG. 3A is a block diagram illustrating a white box switch, according to example embodiments.

FIG. 3A is a block diagram illustrating a white box switch 212, according to example embodiments. The white box switch 212 may include a receiving module 302 and a processing module 304 including a ternary content addressable memory (TCAM) 306. The receiving module 302 may receive configuration information from the controller computer 214. The configuration information may include TCAM instructions. The processing module 304 may utilize the TCAM instructions to program the TCAM 306 (e.g., program the TCAM 306 with the TCAM instructions). In accordance with its programming, the TCAM 306 receives traffic information into the white box switch 212 and forwards the traffic information out of the white box switch 212. For example, the TCAM 306 may receive traffic information (e.g., packets) on a port of the white box switch 212 and forward the traffic information out a port on the white box switch 212 in accordance with its programming. Further, in accordance with its programming, the TCAM 306 may filter the traffic information. For example, the TCAM 306 may receive traffic information (e.g., packets) on a port of the white box switch 212 and forward only traffic information that matches a particular value out a port on the white box switch 212 in accordance with its programming. The operation of the TCAM 306 is further explained below.

Figure 3B:
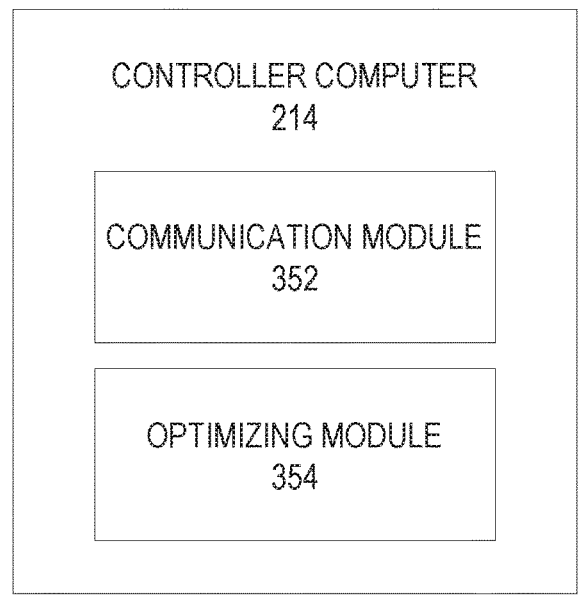
FIG. 3B is a block diagram illustrating a controller computer, according to example embodiments.

FIG. 3B is a block diagram illustrating a controller computer 214, according to example embodiments. The controller computer 214 may include a communication module 352 and an optimizing module 354. The optimizing module 354 may generate the TCAM instructions for a white box switch 212 and the communication module 352 may communicate the TCAM instructions to the white box switch 212. The optimizing module 354 may optimize the programming of the TCAM 306 by minimizing the number of TCAM instructions. For example, the optimizing module 354 may optimize a routine service chain TCAM program by removing TCAM instructions from the routine service chain TCAM program or adding TCAM instructions to the routine service chain TCAM program responsive to identifying a triggering condition. For example, the optimizing module 354 may optimize a routine service chain TCAM program by removing TCAM instructions from the routine service chain TCAM program responsive to the optimizing module 354 identifying the triggering condition of an in-line service system 202 receiving "all" traffic information. Further for example, the optimizing module 354 may optimize a routine service chain TCAM program by removing TCAM instructions from the routine service chain TCAM program responsive to the optimizing module 354 identifying the triggering condition of an in-line service 202 system receiving mutually exclusive traffic information (e.g., non-intersecting traffic information) (e.g., no match intersection). Finally, for example, the optimizing module 354 may optimize a routine service chain TCAM program by adding TCAM instructions to the routine service chain TCAM program responsive to identifying the triggering condition of duplicating a portion of traffic information that is being received by a particular in-line service system 202. In some embodiments, the optimizing module 354 may execute in the white box switch 212.

Figure 4:
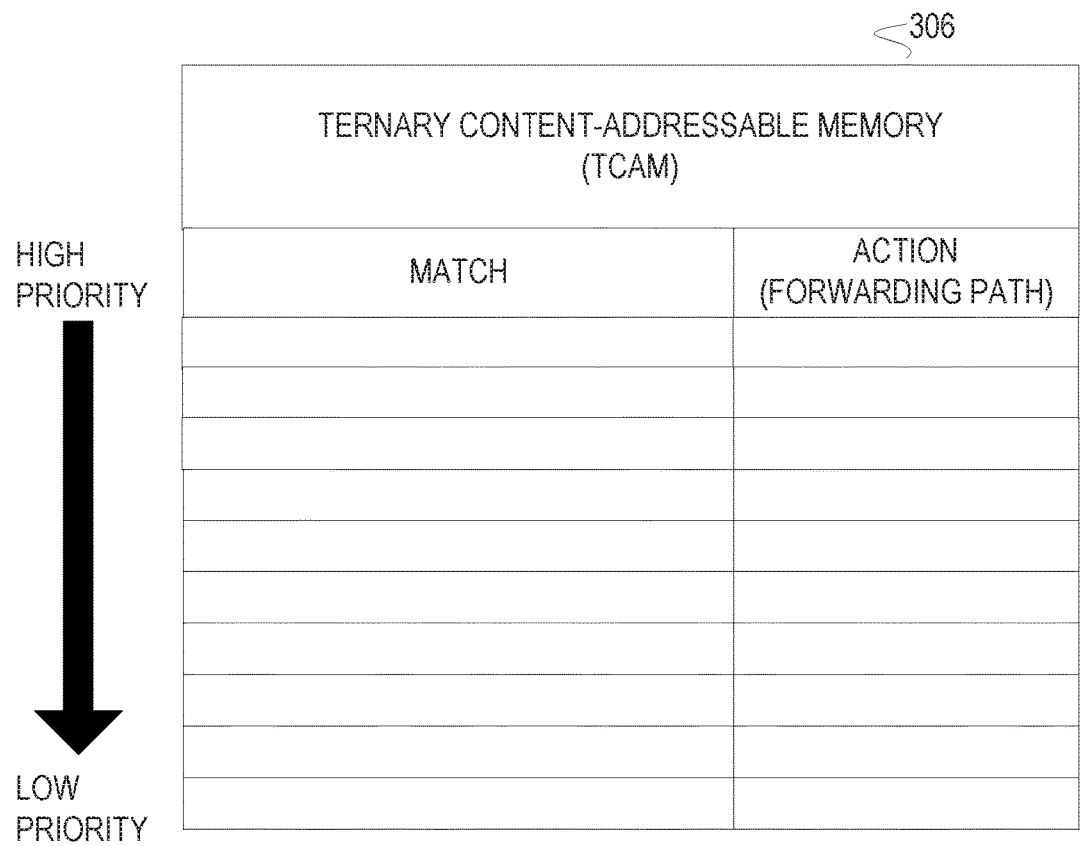
FIG. 4 is a block diagram illustrating a ternary content-addressable memory (TCAM), according to example embodiments, not programmed.

FIG. 4 is a block diagram illustrating a TCAM 306, according to an embodiment. The TCAM 306 includes a table including two columns. The table may be configured with TCAM instructions. The column on the left is identified "MATCH" and the column on the right is identified "ACTION." A single TCAM instruction occupies a row including a "MATCH" part and an "ACTION" part. The TCAM 306 executes from the top down by looking up (e.g., reading a row of) TCAM instructions from the table. In general, the "MATCH" operation 1) directs the TCAM 306 to inspect a port on the white box switch 212 for a packet/frame; and 2) directs the TCAM 306 to perform a match operation on the packet responsive to identifying the packet at the port. For example, a "MATCH" operation may direct the TCAM 306 to port "1" on a white box switch 212. Responsive to identifying a packet at port "1" the TCAM 306 may compare a part of the packet with a value. If the MATCH is TRUE (e.g., the part of the packet matches the value), then the TCAM 306 performs the corresponding "ACTION." Other types of MATCHING may be performed. The ACTION part of the TCAM 306 instruction directs a flow operation. A flow operation may include directing the white box switch 212 to forward the packet to a specified port on the white box switch 212. If the MATCH operation is not TRUE, the TCAM 306 does not execute the corresponding ACTION but rather skips to the TCAM instruction in the row immediately below the current row. Accordingly, the TCAM 306 moves down the table looking up and performing TCAM instructions until a MATCH operation is identified as TRUE causing the corresponding ACTION to be performed or until all of the TCAM instructions in the table are exhausted.

FIG. 5 is a block diagram illustrating a routine in-line service chain TCAM program 500 (routine TCAM program 500), according to an embodiment. The routine TCAM program 500 is illustrated as being stored in a TCAM 306 and being configured for three-in line service systems (e.g., "IS A"—in-line service system 202 "A," and so forth). The routine TCAM program 500 is characterized as "routine" because it assumes intersecting traffic information for each of the three in-line service systems 202 (e.g., "A," "B" and "C"). For example, the matching traffic information for the in-line service system 202 "A" may include the matching traffic information for the in-line service system 202 "B" that may include the matching traffic information for the in-line service system 202 "C." The routine TCAM program 500 in FIG. 5 may be implemented in accordance with the port numbering scheme and the in-line service systems 202 "A" "B" and "C," as shown in the system 200 on FIG. 2.

Figure 6A:
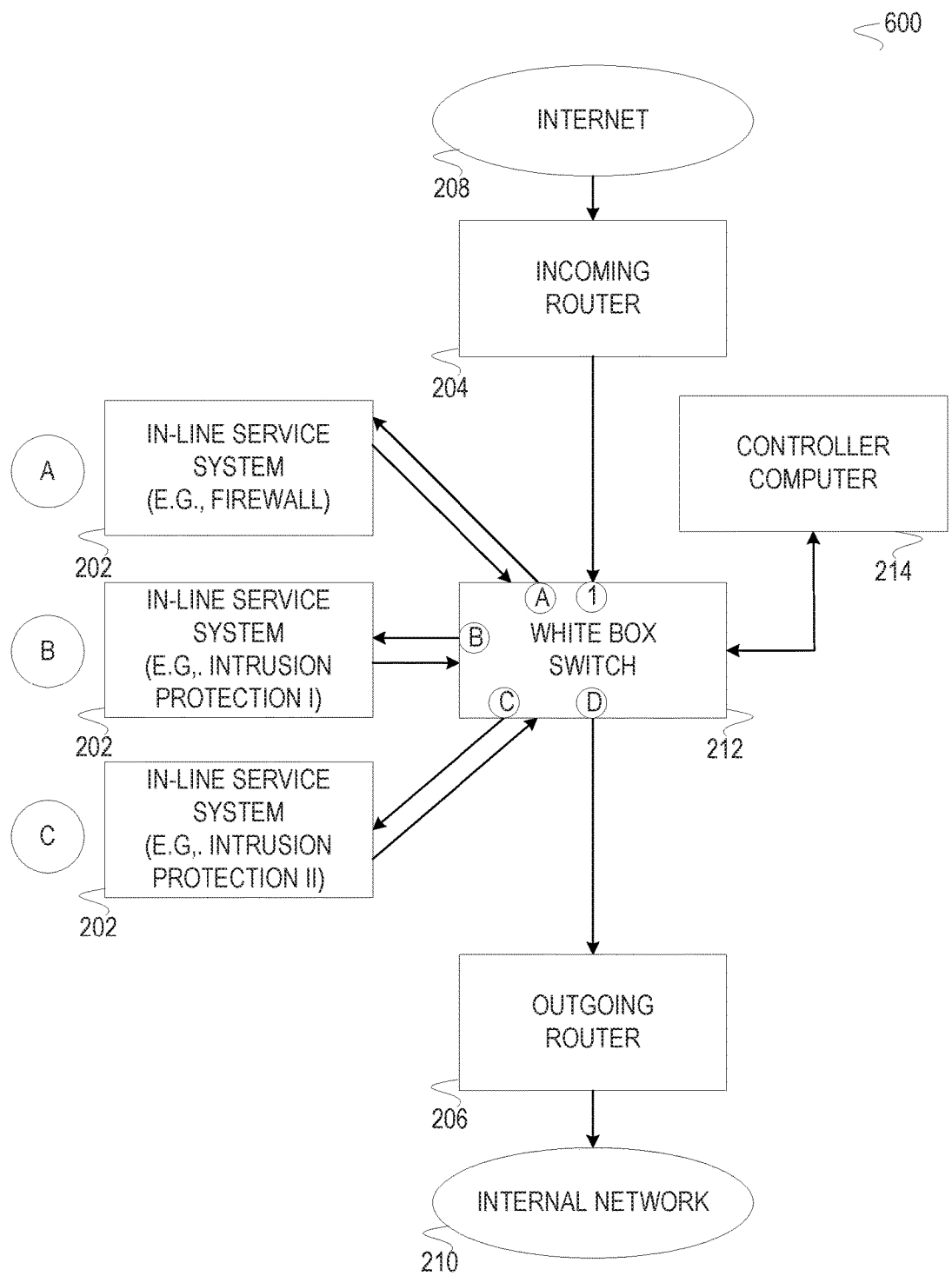
FIGS. 6A-6D are block diagrams illustrating systems, according to example embodiments, to process traffic information with a service chain.

Returning to FIG. 5, the routine TCAM program 500 is comprised of TCAM instructions. The first four rows correspond to four flows originating from port "1" on the white box switch 212 and respectively being forwarded to in-line service system 202 "A," in-line service system 202 "B," in-line service system 202 "C," and the router connected to the internal network 210, as shown in FIG. 6A. For example, in accordance with FIG. 6A and FIG. 5, the first row in the TCAM 306 directs a flow of a packet from port "1" to path "A" (e.g., to in-line system "A") responsive to identifying a match of a source Internet Protocol (IP) address of "1.1.1.1" in the packet detected at port "1" from incoming router 204 connected to the Internet 208; the second row in the TCAM 306 directs a flow of a packet also from port "1" over a path "B" (e.g., to in-line service system "B") responsive to identifying a match of a destination IP address of "1.1.1.1" in the packet identified at port "1"; the third row in the TCAM 306 directs a flow of a packet from port "1" over a path "C" (e.g., to in-line service system 202 "C") responsive to identifying a match of Hyper Text Transport Protocol ("HTTP") traffic type in the packet identified at port "1"; and the fourth row directs a flow of any remaining packet (e.g., "*") at port "1" over a path "D" to the outgoing router 206 connected to internal network 210. That is, the final row for port "1" forwards the packet detected at port "1" to the outgoing router 206 responsive to the packet not matching any of the previous three instructions for port "1.'

Figure 6B:
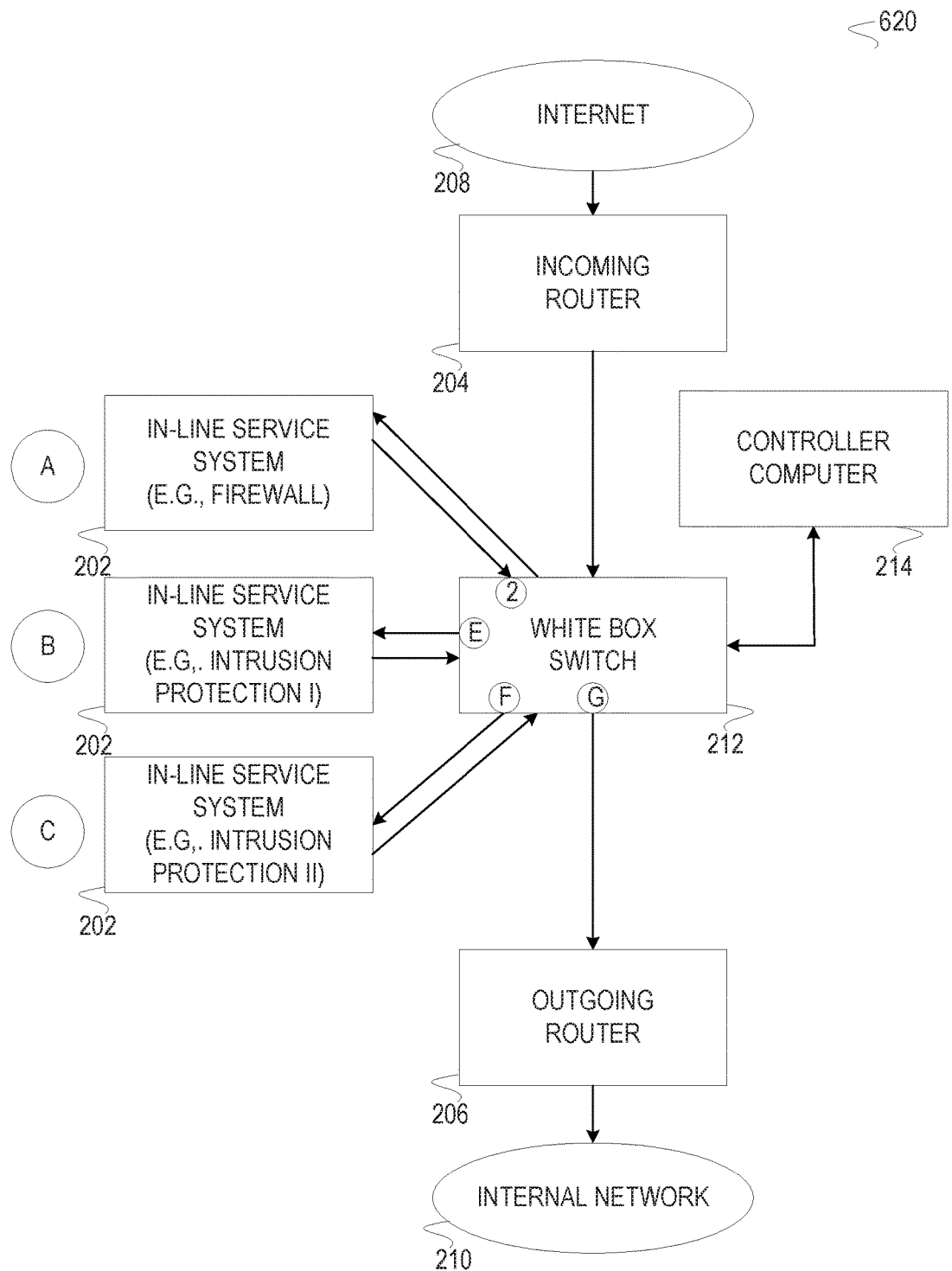

The next three rows correspond to three flows originating from port "2" on the white box switch 212 (e.g., in-line service system 202 "A") shown in FIG. 6B. For example, the fifth row from the top of the TCAM 306 directs a flow of a packet from port "2" to path "E" (e.g., to in-line service system 202 "B") responsive to identifying a match IP destination address "1.1.1.1" in the packet at port "2"; the sixth row from the top of the TCAM 306 directs a flow of a packet from port "2" over a path "F" (e.g., to in-line service system 202 "C") responsive to identifying a match of "HTTP" traffic type in the packet at port "2"; the seventh row from the top of the TCAM 306 directs a flow of any packet remaining (e.g., "*") at port "2" over a path "G" to the outgoing router 206 connected to internal network 210. That is, the final row for port "2" forwards the packet detected at port "2" to the outgoing router 206 responsive the packet not matching the previous two instructions for port "2."

Figure 6C:
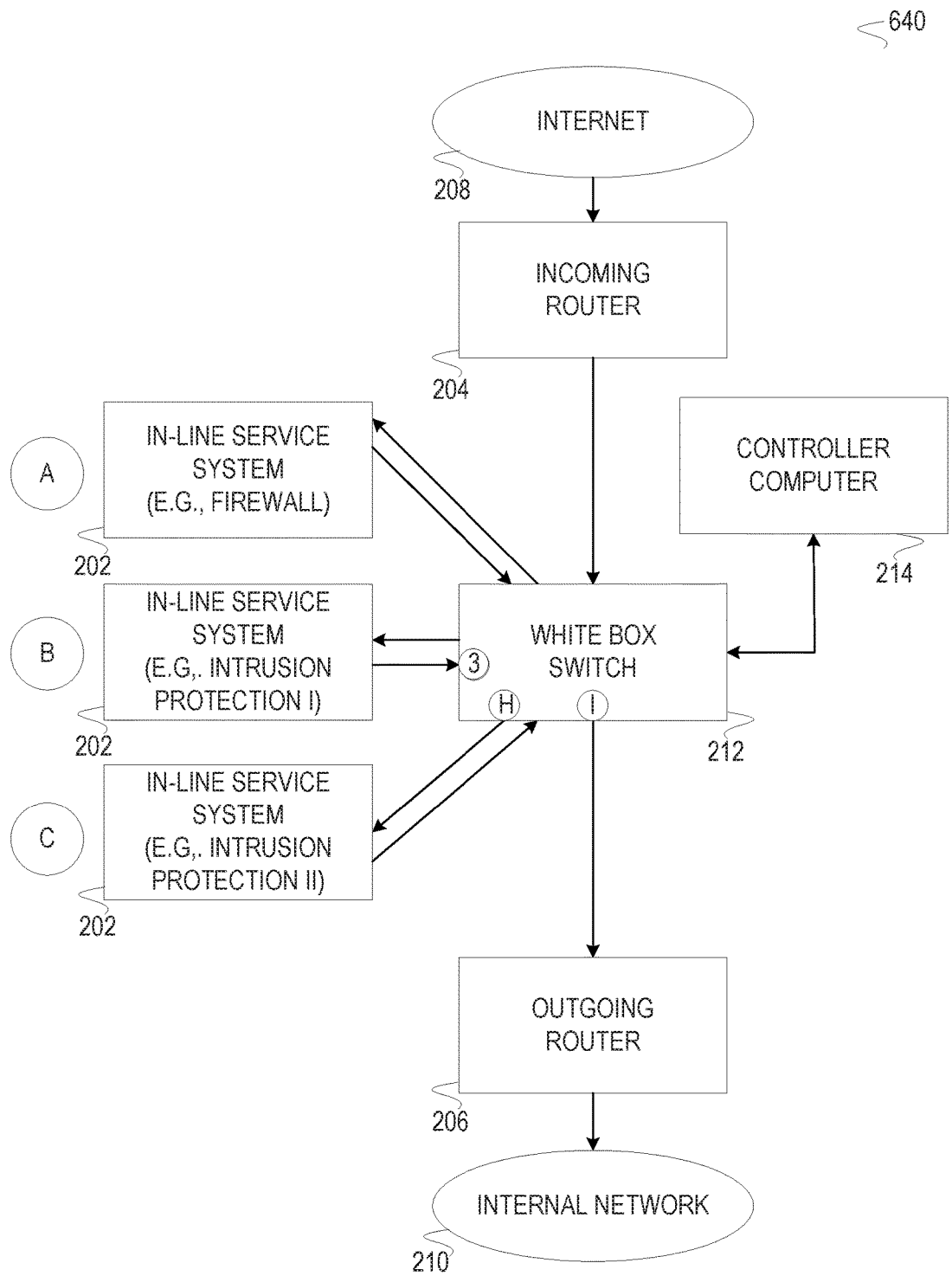

The next two rows correspond to two flows originating from port "3" on the white box switch 212 (e.g., in-line service system 202 "B") shown in FIG. 6C. For example, the eight row from the top of the TCAM 306 directs a flow of a packet from port "3" to path "H" (e.g., to in-line service system 202 "C") responsive to identifying a match of "HTTP" traffic type in the packet at port "3"; the ninth row from the top of the TCAM 306 directs a flow of any packet (e.g., "*") from port "3" over a path "I" (e.g., to the outgoing router 206 connected to internal network 210). That is, the final row for port "3" forwards the packet detected at port "3" to the router responsive the packet not matching the previous instruction for port "3.'

Figure 6D:
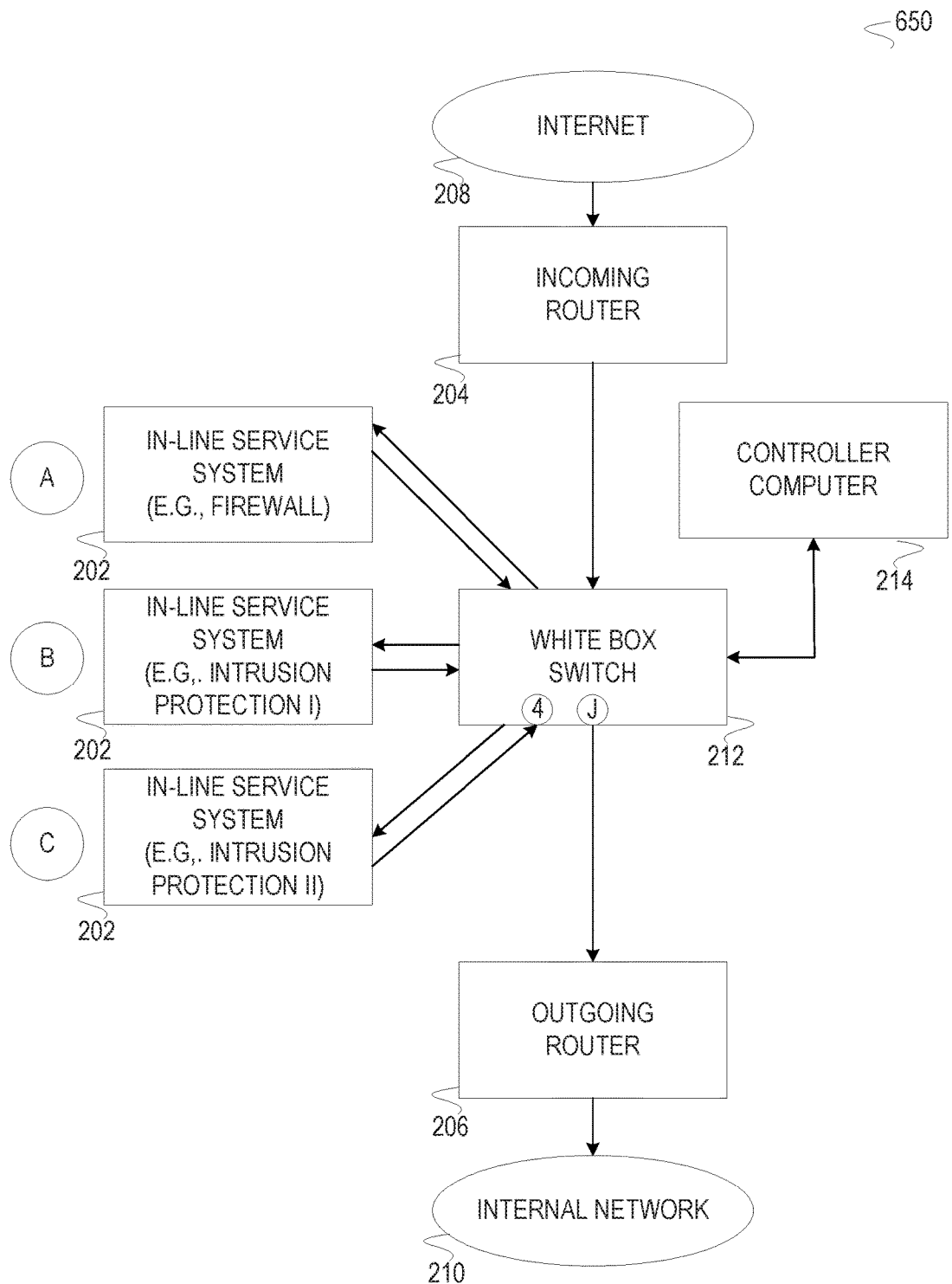

The next row corresponds to a flow originating from port "4" on the white box switch 212 (e.g., in-line service system 202 "C") shown in FIG. 6D. For example, the tenth row from the top of the TCAM 306 directs a flow of any packet (e.g., "*") from port "4" over path "J" to the outgoing router 206 connected to internal network 210. It may be observed that the each instruction is prioritized in accordance with a particular port whereby the higher priorities within the port are serviced before lower priorities within the port.

FIG. 7 is a block diagram illustrating an optimized TCAM program 700, according to an embodiment. The optimized TCAM program 700 is shown to be stored in the TCAM 306 and is configured with a routine in-line service chain TCAM program 500 for three in-line service systems 202 (e.g., "A", "B," and "C") that receive intersecting traffic information that is further optimized for an in-line service system 202 "B" receiving "ALL" packets. For example, the system 200, as shown in FIG. 2, may include the optimized TCAM program 700 as configured with the in-line routine service chain TCAM program, as shown in FIG. 7, for three in-line service systems 202 (TCAM program) that receive intersecting traffic information and be optimized for the in-line service system "A" receiving packets including a source IP address of "1.1.1.1," the in-line service system "B" receiving "ALL" packets and the in-line service system "C" receiving packets in the "HTTP" traffic type. The optimized routine TCAM program 700 illustrated in FIG. 7 is optimized by removing a set of TCAM instructions including the third, fourth, sixth and seventh instructions (e.g., illustrated as stricken) from the top of the TCAM 306.

For example, the system 200, as shown in FIG. 2, may include the TCAM 306 as configured with the optimized TCAM program 700, as shown in FIG. 7. The optimized TCAM program 700 may be for three in-line service systems 202 receiving intersecting traffic information including the in-line service system 202 "A" receiving packets for a source IP address of "1.1.1.1," the in-line service system 202 "B" receiving "ALL" packets and the in-line service system 202 "C" receiving packets for the "HTTP" traffic type. The optimized TCAM program 700 illustrated in FIG. 7 is optimized by removing a set of TCAM instructions including the third, fourth, sixth and seventh instructions (e.g., illustrated as stricken) from the top of the TCAM 306.

A general rule follows, specifically all TCAM instructions: 1) identifying receipt of traffic information from a particular port and 2) identified as following an instruction including an "ALL" type MATCH, may be stricken/omitted. The number of in-line service systems 202 may vary. Further, the specific matching conditions associated with each in-line service system 202 (other than the service system receiving "ALL" packets) may vary. Accordingly, the optimizing module 354 may generate an optimized TCAM program 700 responsive to identifying "ALL" traffic being matched and forwarded to a particular in-line service system 202. According to one embodiment, the optimizing module 354 may optimize by generating the routine TCAM program 500 for Nx in-line service systems 202 and striking/omitting TCAM instructions following an instruction including an "ALL" MATCH within a particular port. According to another embodiment, the optimizing module 354 may optimize by generating the routine TCAM program 500 for Nx in-line service systems 202 without the TCAM instructions following an instruction including an "ALL" MATCH within a particular port.

Figure 8:
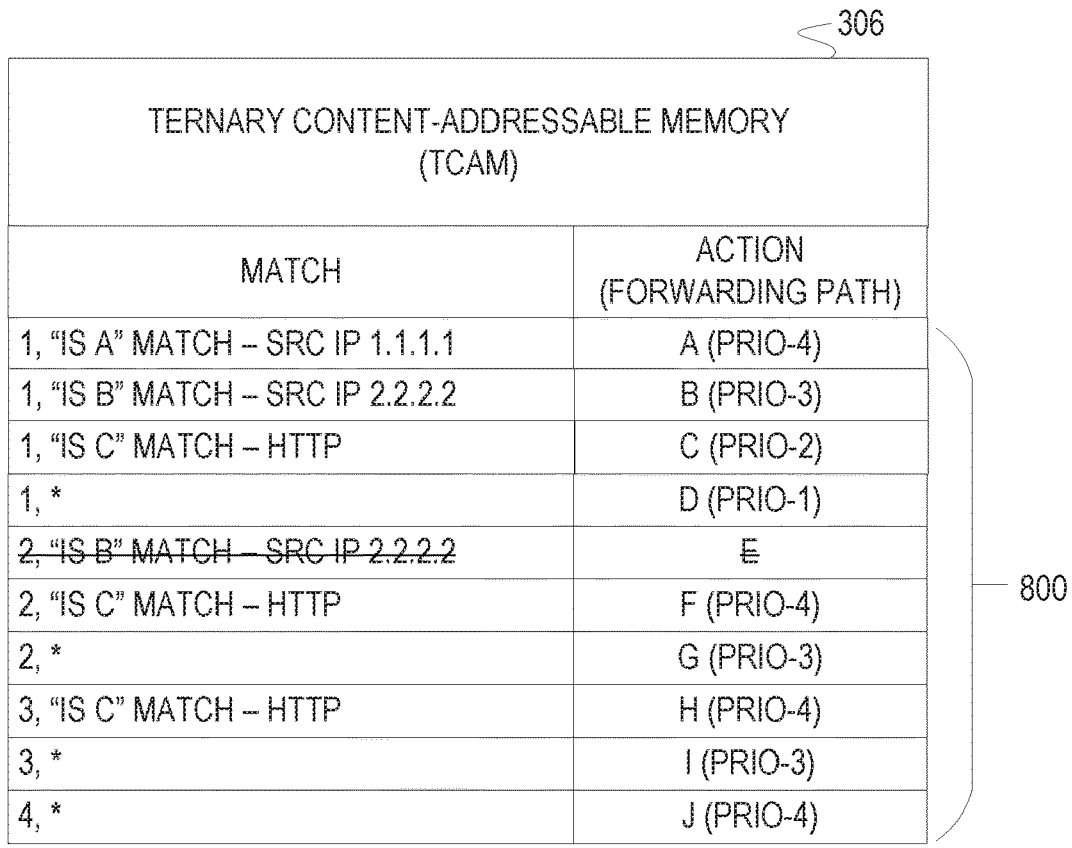
FIG. 8 is a block diagram illustrating an optimized TCAM program, according to example embodiments.

FIG. 8 is a block diagram illustrating an optimized TCAM program 800, according to an embodiment. The optimized TCAM program 800 is shown to be stored in a TCAM 306 and is configured with the routine TCAM program 500 for three in-line service systems 202 (e.g., "A", "B," and "C") that receive partially non-intersecting traffic information that is further optimized for an in-line service system 202 "A" and an in-line service system 202 "B" receiving traffic information (e.g., packets) that are non-intersecting. Specifically, the in-line service system 202 "A" receives packets with a source IP address of "1.1.1.1" and the in-line service system 202 "B" receives packets with a source IP address of "2.2.2.2." Accordingly, the packets received by the in-line service system 202 "A" are not received by the in-line service system 202 B and the packets received by the in-line service system 202 B are not received by the in-line service system 202 C (e.g., non-intersecting). The system 200, as shown in FIG. 2, may include the optimized TCAM program 800 as configured with the optimized TCAM program 800, as shown in FIG. 8, for three in-line service systems (TCAM programs) that receive partially-intersecting traffic information and being optimized for the in-line service system 202 "A" receiving packets including a source IP address of 1.1.1.1, the in-line service system 202 "B" receiving packets including a source IP address of 2.2.2.2 and the in-line service system 202 "C" receiving packets in the "HTTP" traffic type. The optimized TCAM program 800 illustrated in FIG. 8 is optimized by removing a TCAM 306 instruction, the fifth instruction (e.g., illustrated as stricken) from the top of the TCAM 306.

A general rule follows for a port other than the first port. Specifically, all TCAM instructions that are identified as 1) receiving traffic information from the same port and 2) matching traffic information that is mutually exclusive (non-intersecting) to the traffic information (e.g., packet) originating from the port may be stricken/omitted. The number of in-line service systems 202 may vary. Further, the specific matching conditions associated with each of the other in-line service systems 202 (e.g., service systems that are not mutually exclusive) may vary. Accordingly, the optimizing module 354 may generate an optimized TCAM program 800 responsive to identifying non-intersecting (mutually exclusive) traffic being forwarded to a particular in-line service system 202. According to one embodiment, the optimizing module 354 may optimize by generating the routine TCAM program 500 for N× in-line service systems 202 and striking/omitting TCAM instructions that are identified both as being within a particular port, other than the first port, and matching traffic information that is mutually exclusive (e.g., non-intersecting) to the traffic information (e.g., packet) originating from the port. According to another embodiment, the optimizing module 354 may optimize by striking/omitting the TCAM instructions that are identified both as being within a particular port, other than the first port, that match traffic information that is mutually exclusive (e.g., non-intersecting) to the traffic information (e.g., packet) originating from the port.

Figure 9:
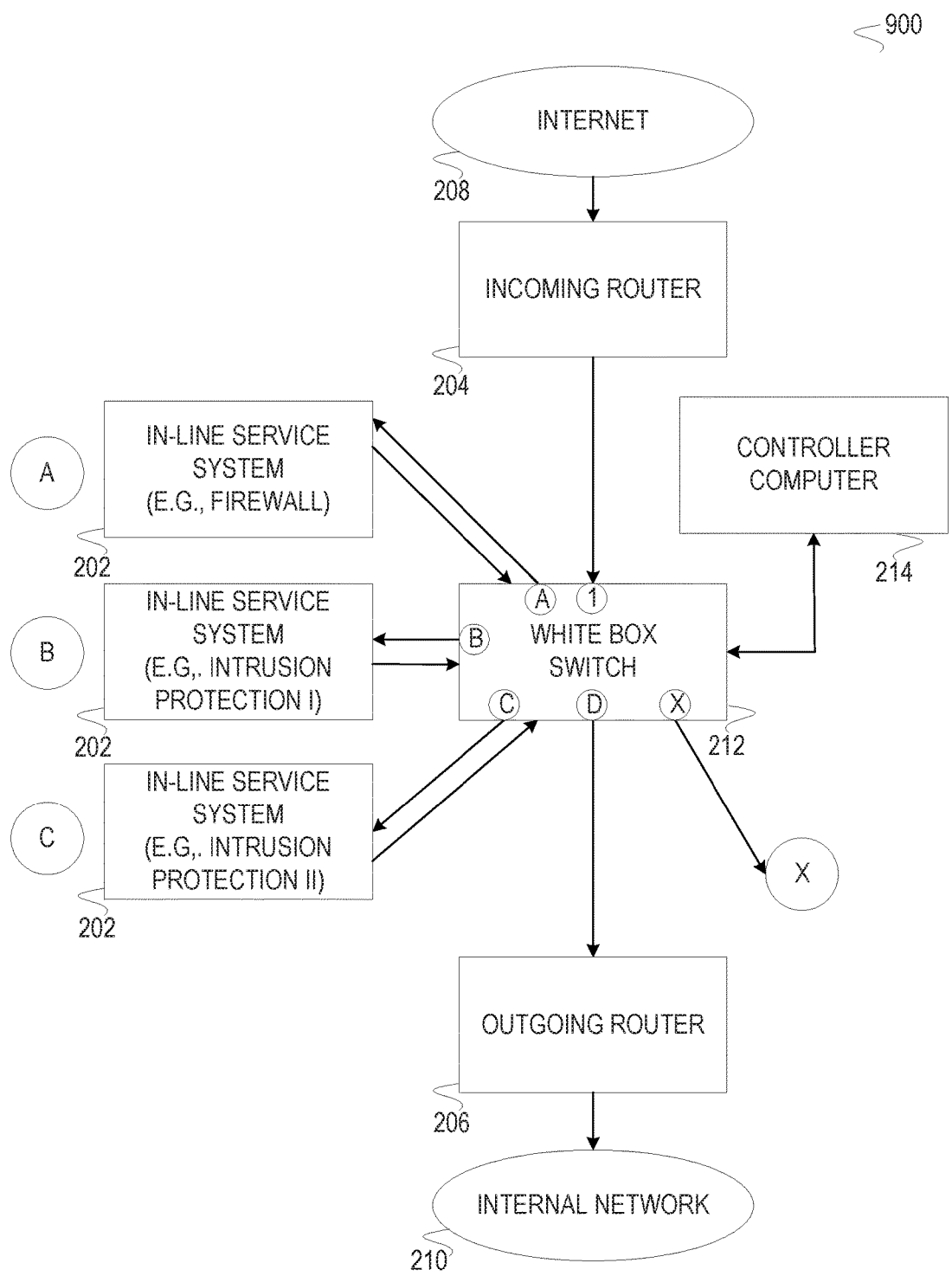
FIG. 9 is a block diagram illustrating a system, according to example embodiments, to optimize processing of service chain traffic.

FIG. 9 is a block diagram illustrating a system 900 to optimize processing of service chain traffic, according to example embodiments. The system 900 is similar to the system 200 illustrated in FIG. 2 and FIGS. 6A-6D but further includes a duplication of the traffic being received by the in-line service system 202 "C." The circle towards the bottom right is illustrated to signify receipt of a duplication of the traffic being received by the in-line service system "C."

FIG. 10 is a block diagram illustrating an optimized TCAM program 1000, according to an embodiment. The optimized TCAM program 1000 is shown to be stored in the TCAM 306 and is configured with a routine service chain TCAM program for three in-line service systems 202 (e.g., "A", "B," and "C") that receive non-intersecting traffic information and further are configured for duplication of traffic information that is received by the in-line service system 202 "C" for communication to the system "X" (e.g., router, computer, network entity, etc.), as illustrated in FIG. 9. For example, the traffic information that is being duplicated may be HTTP traffic.

The optimized TCAM program 1000 is configured with a routine TCAM program 500 that is optimized for a duplication of the traffic being received by the in-line service system 202 "C" and forwarding of the duplicated traffic (e.g., HTTP traffic information) over the communication link to "X" (e.g., router, computer, node, etc.). Specifically, the modifications to the routine TCAM program 500 are shown to be limited to traffic information being received on port "1." Specifically, within the set of TCAM instructions matching on port "1," two TCAM instructions are added and an existing TCAM 306 instruction is modified. The two TCAM instructions being added may be generated by copying the two existing TCAM instructions directed at matching service for in-line service system 202 "A" ("MATCH SRC-IP 1.1.1.1") and in-line service system 202 "B" ("MATCH DST-IP 1.1.1.1"), adding the "HTTP" MATCH to both of the copied TCAM instructions, and adding an additional flow to "X" (e.g., router, computer, node, etc.) for each of the copied TCAM instructions (e.g., the first copied instruction includes flows A+X while the second copied instruction includes flows B+X). The existing TCAM 306 instruction is for in-line service system 202 "C" and is modified by applying an addition flow to the ACTION part of the TCAM 306 instruction. Specifically, an additional flow to X is added to the TCAM 306 instruction (C+X).

A general rule follows. For the first port only, the traffic information in the flows to each of the in-line service systems 202 (e.g., "A," "B" and "C") is duplicated and forwarded to a designated port responsive to an identification of a match of the requested traffic information in the respective flows. Accordingly, the optimizing module 354 may generate an optimized TCAM program 1000 responsive to receiving 1) a request to duplicate and forward traffic information being received by a particular in-line service and 2) a forwarding destination. According to one embodiment, the optimizing module 354 may optimize the TCAM program by 1) generating the routine TCAM program 500; 2) for the first port only, generating additional TCAM instructions by copying existing TCAM instructions for flows to all in-line service systems 202 other than the in-line service system 202 with the traffic flow being duplicated, the copied TCAM instructions including an additional MATCHING for the requested traffic information, and further including an additional flow to the requested forwarding destination; and 3) modifying the TCAM 306 instruction flowing to the in-line service system 202 with the traffic flow being duplicated by adding an additional flow to the requested forwarding destination (e.g., "X").

FIG. 11 is pseudo code for a method 1100 (e.g., generating instructions) to optimize processing of in-line service chain traffic, according to example embodiments. The method 1100 optimizes responsive to identifying the triggering condition of an in-line service system 202 receiving "ALL" traffic information and responsive to identifying the triggering condition of an in-line service system 202 receiving traffic information that is non-intersecting with the traffic information of another in-line service system 202. The method 1100 does not optimize for requests to duplicate traffic information.

Figure 12A:
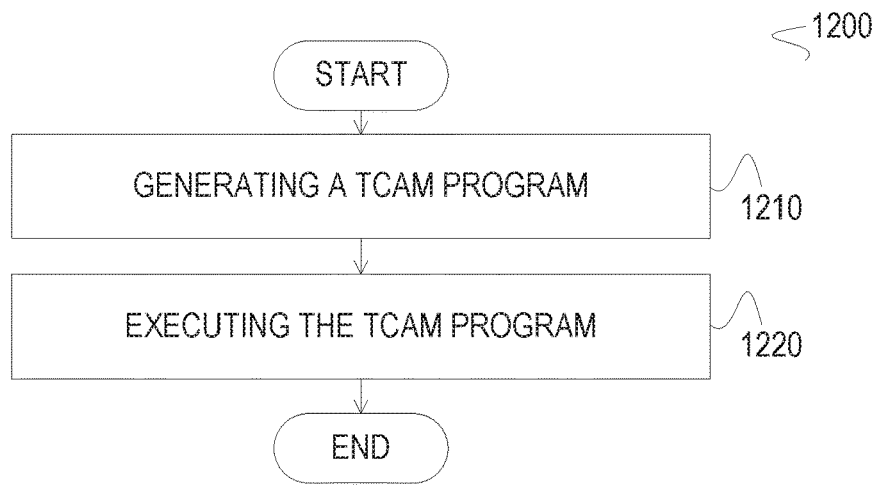
FIG. 12A is a block diagram illustrating a method, according to an example embodiment, to optimize processing of service in-line chain traffic.

FIG. 12A is a block diagram illustrating a method 1200, according to an example embodiment, to optimize processing of service in-line chain traffic. The method 1200 may commence, at operation 1210, with a controller computer 214, generating a TCAM program (e.g., routine TCAM program 500, optimized TCAM programs 700, 800, and 1000). For example, the controller computer 214 may generate the TCAM program (with or without an optimization).

Further, at operation 1210, the controller computer 214 communicates the TCAM program, over a communication link, to a white box switch 212. The operation 1210 is described further in FIG. 12B.

At operation 1220, the white box switch 212 executes the TCAM program. For example, at operation 1220, at the white box switch 212, a communication module 352 may receive the TCAM program from the controller computer 214, a processing module 304 may load the TCAM program into the TCAM 306, and the white box switch 212 executes the TCAM program. In another embodiment, the communication module 352 and the optimizing module 354 execute on the white box switch 212 rather than the controller computer 214.

Figure 12B:
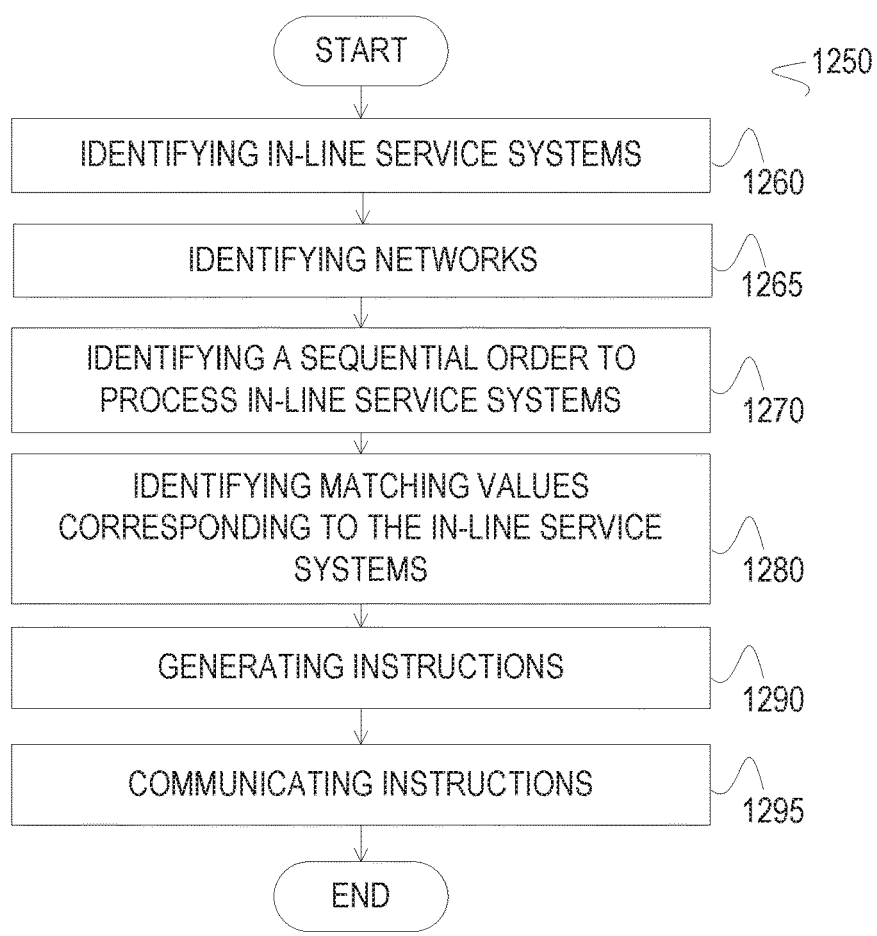
FIG. 12B is a block diagram illustrating a method, according to some example embodiments, to generate a TCAM program.

FIG. 12B is a block diagram illustrating a method 1250, according to some example embodiments, to generate a TCAM program. The method 1250 further describes operation 1210, in FIG. 12A. The method 1250 executes on the controller computer 214. The method 1250 commences, at operation 1260, with the communication module 352 being utilized to identify configuration information in the form of two or more in-line service systems 202. Merely for example, the communication module 352 may identify an in-line service system 202 by receiving a command from an administrator who operates a terminal that is communicatively coupled to the controller computer 214. The command may include an in-line service system 202 identifier (e.g., names, network address information, etc.) in association with a port identifier that identifies a port on a white box switch 212 that communicatively couples the white box switch 212 and in-line service system 202. In another embodiment, the communication module 353 may automatically identify an in-line service system 202 is connected to a white box switch 212. For example, the white box switch 212 may detect the in-line service system 202 and communicate an in-line service system identifier to the controller computer 214.

At operation 1265, the communication module 352 may be utilized to identify configuration information in the form of two networks. Merely for example, the communication module 352 may identify the two networks by receiving two commands. For example, the command may include a network identifier in association with an incoming identifier in association with a port identifier that identifies a particular port on a white box switch 212 that is communicatively coupled to the identified network. A network may be identified as incoming to assign the below described processing order (e.g., the in-line service system 202 processed first is associated with the incoming network). In some embodiments, the traffic information is identified as being communicated in both directions. In another embodiment, the communication module 353 may automatically identify the two networks are connected to a white box switch 212. For example, the white box switch 212 may detect the two networks and communicate network identifiers to the controller computer 214.

At operation 1270, the communication module 352 identifies configuration information in the form of a sequential order for processing the in-line service systems 202. The communication module 352 may identify the sequential order of the in-line service systems 202 by receiving a command. The command may include one or more sequential order identifier(s) (e.g., ascending identifier, descending identifier, names of in-line service systems 202 in a particular order). In another embodiment, the communication module 353 may automatically identify the order based on a predetermined rule (e.g., according to port number).

At operation 1280, the communication module 352 identifies configuration information in the form of matching values corresponding to each of the in-line service systems 202. The communication module 352 may identify the matching values by receiving a command for each of the previously configured in-line service systems 202. The command may include the matching value in association with an in-line service system identifier. The matching value may include the value (e.g., "1.1.1.1") and meta-data (e.g., source address—Internet Protocol Address) that describes the value. The meta-data may be utilized by the TCM to identify the location of a field in a packet and the length of the field in the packet. The TCAM 306 may compare the value received via the command with the contents of the field to identify whether the packet matches.

In summary, the communication module 352 may identify configuration information as follows:

TABLE A

| NETWORK | PORT |
|---|---|
| INTERNET | 1 |
| INTERNAL | 5 |

TABLE B

| IN-LINE SERVICE SYSTEM 202 | PROCESSING ORDER | PORT | MATCHING VALUE - META-DATA & VALUE |
|---|---|---|---|
| SYSTEM A | FIRST | 2 | SOURCE INTERNET PROTOCOL ADDRESS/1.1.1.1 |
| SYSTEM B | SECOND | 3 | DESTINATION INTERNET PROTOCOL ADDRESS/1.1.1.1 |
| SYSTEM C | THIRD | 4 | TRAFFIC TYPE/HYPERTEXT TRANSPORT PROTOCOL (HTTP) |

At operation 1290, the optimizing module 354 generates TCAM instructions based on the configuration information. The operation 1290 is described further in FIG. 13A.

At operation 1295, the communication module 352 communicates the TCAM instructions to the white box switch 212.

Figure 13A:
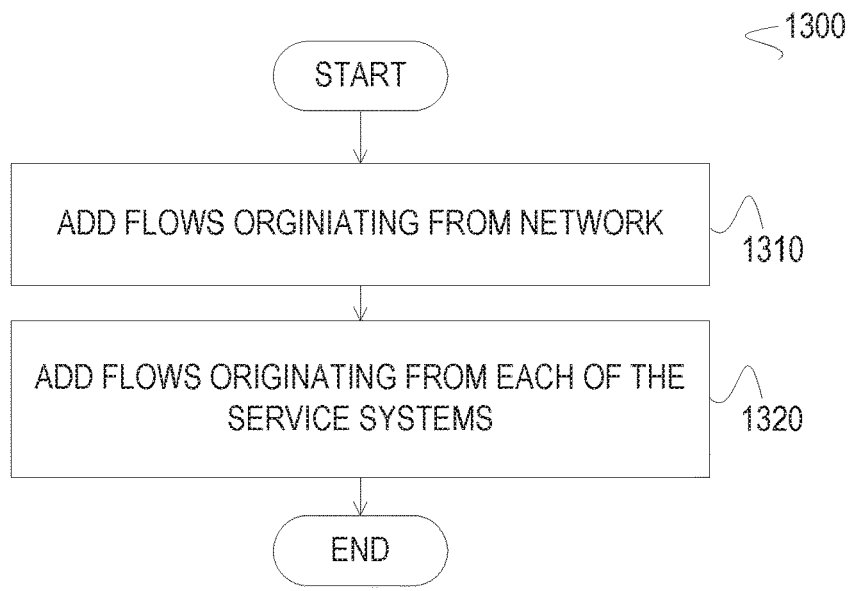
FIG. 13A is a block diagram illustrating a method, according to some example embodiments, to generate instructions.

FIG. 13A is a block diagram illustrating a method 1300, according to some example embodiments, to generate instructions. The method 1300 further describes operation 1290, in FIG. 12B. The method 1300 commences at operation 1310, at the controller computer 214, with the optimizing module 354 generating TCAM instructions that that respectively add flows of traffic information originating from an identified network (e.g., from the Internet 208 or from the internal network 210). For example, the optimizing module 354 may add flows of traffic information originating from the Internet 208, via the incoming router 204 at port "1," as shown on FIG. 6A. At operation 1320, the optimizing module 354 generates TCAM instructions that respectively add flows of traffic information originating from each of the in-line service systems 202. For example, the optimizing module 354 may generate TCAM instructions that respectively add flows of traffic information originating from each of the in-line service systems 202 that are identified for a particular system. For example, TABLE B, as related above, includes three in-line service systems 202 that were identified for a particular system.

Figure 13B:
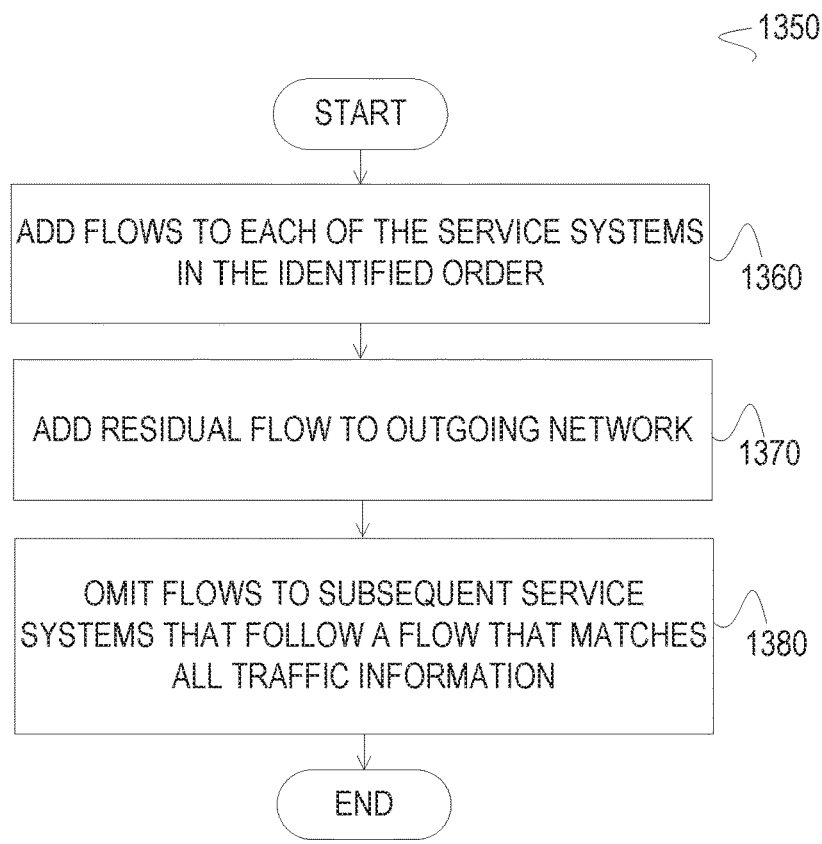
FIG. 13B is a block diagram illustrating a method, according to some example embodiments, to add flows originating from an incoming network.

FIG. 13B is a block diagram illustrating a method 1350, according to some example embodiments, to add flows of traffic information originating from a network. The method 1350 further describes operation 1310, in FIG. 13A. The method 1350 commences at operation 1360, at the controller computer 214, with the optimizing module 354 generating TCAM instructions that add flows of traffic information that originate from the port associated with the identified network and are forwarded to the a particular in-line service system 202. Merely for example, the optimizing module 354 may generate TCAM instructions that add flows of traffic information that originate from the port "1" (e.g., incoming router 204 connected to Internet 208, as shown in FIG. 6A) and are forwarded to the in-line service system 202 "A" (e.g., 1, "IS A" MATCH—SRC IP 1.1.1.1|A (PRIO-4), the in-line service system 202 "B" (e.g., 1, "IS B" MATCH—DST IP 1.1.1.1|B (PRIO-3), and the in-line service system 202 "C" (e.g., 1, "IS C" MATCH—HTTP|C (PRIO-3), as illustrated in FIG. 5.

At operation 1370, the optimizing module 354 may add a residual flow of traffic information from one network to another network. For example, the optimizing module 354 may add a residual flow of traffic information originating on port "1" from the incoming router 204 (e.g., connected to Internet 208, as shown in FIG. 6A) and flowing to the outgoing router 206 (e.g., internal network 210, as also shown in FIG. 6A), as illustrated in FIG. 5 (e.g., 1, *|D (PRIO 1).

At operation 1380, the optimizing module 354 may omit one or more TCAM instructions for flows of traffic information: 1) within a particular port and 2) that follow a TCAM instruction that matches "ALL." Merely for example, the optimizing module 354 may omit/strike the two TCAM instructions for the flows of traffic information: 1) within port "1" and 2) that follow the TCAM instruction "1, "IS B" MATCH "ALL,"|"B (PRIO-3)"" as illustrated in FIG. 7.

Figure 14:
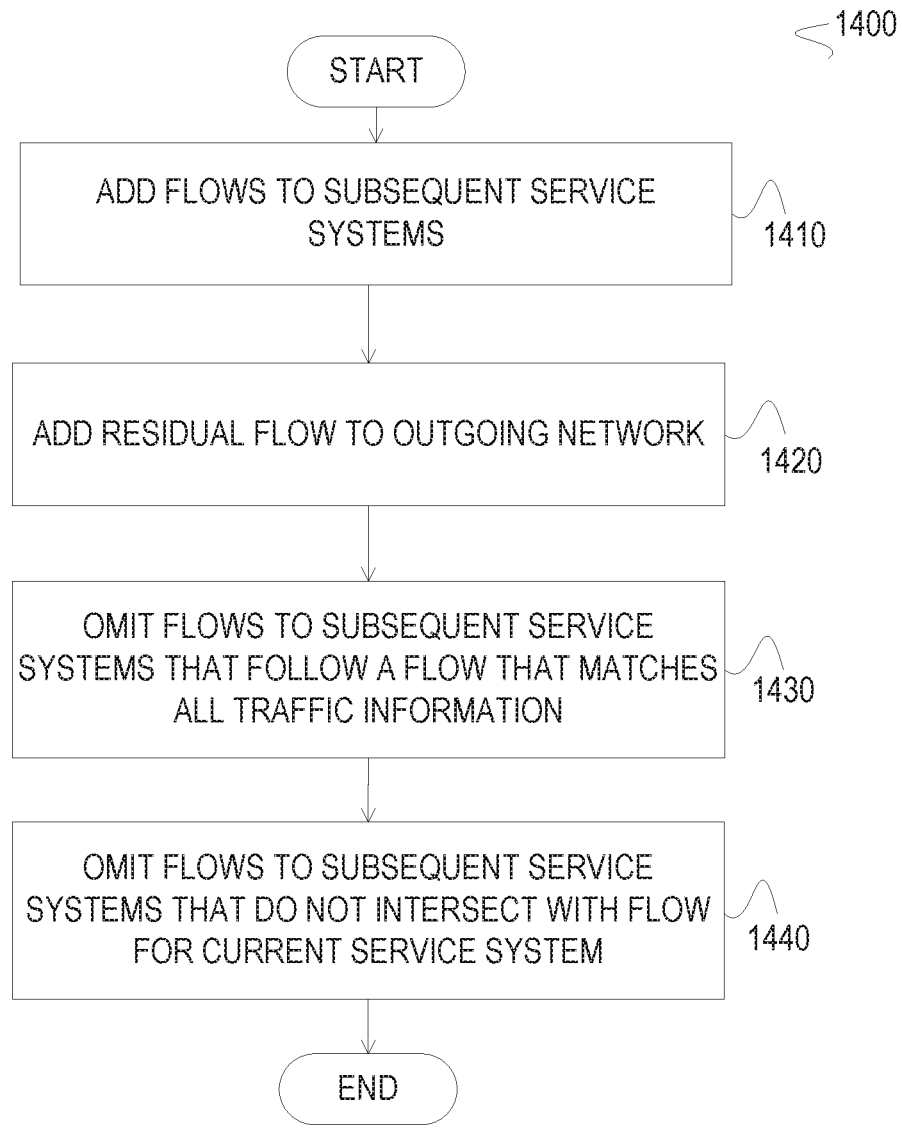
FIG. 14 is a block diagram illustrating a method, according to some example embodiments, to add flows originating from service systems.

FIG. 14 is a block diagram illustrating a method 1400, according to some example embodiments, to add flows originating from in-line service systems 202. The method 1400 further describes operation 1320, in FIG. 13A. The method 1400 may be invoked for each of the in-line service systems 202 (e.g., current in-line service system 202) that are identified for a particular system. For example, TABLE B, as related above, includes three in-line service systems 202 that were identified as "A," "B," and "C" for a particular system.

The method 1400 commences at operation 1410, at the controller computer 214, with the optimizing module 354 generating TCAM instructions that add flows of traffic information that originate with a port associated with a current in-line service system 202 (e.g., current service) and are forwarded to the subsequent in-line service systems 202. Merely for example, the optimizing module 354 may generate TCAM instructions that add flows of traffic information originating from the port "2" associated with a currently in-line service system 202 "A" and are forwarded to subsequent in-line service systems 202 including the in-line service systems 202 "B" (e.g., 1, "IS B" MATCH—DST IP 1.1.1.1|E (PRIO-4), and the in-line service system 202 "C" (e.g., 1, "IS C" MATCH—HTTP|F (PRIO-3), as illustrated in FIG. 5. Further, for example, the optimizing module 354 may generate TCAM instructions that add flows of traffic information originating from the port "3" associated with a current in-line service system 202 "B" and are forwarded to subsequent in-line service systems 202 including the in-line service systems 202 "C" (e.g., 1, "IS C" MATCH—HTTP|H (PRIO-4), as illustrated in FIG. 5.

At operation 1420, the optimizing module 354 may add a residual flow of traffic information from the current in-line service system 202 for forwarding to another network. For example, the optimizing module 354 may add a residual flow of traffic information originating on port "2" from the in-line service system "A" and flowing to the outgoing router 206 (e.g., internal network 210), as illustrated in FIG. 5 (e.g., 2, "*"|G (PRIO 2).

At operation 1430, the optimizing module 354 may omit one or more TCAM instructions for flows of traffic information: 1) within a particular port and 2) that follow a TCAM instruction that matches "ALL." Merely for example, the optimizing module 354 may omit/strike the two TCAM instructions for the two flows of traffic information: 1) within port "1" and 2) that follow the TCAM instruction "1, "IS B" MATCH "ALL,"|"B (PRIO-3"), as illustrated in FIG. 7.

At operation 1440, the optimizing module 354 may omit one or more TCAM instructions for flows of traffic information that are identified as: 1) receiving traffic information from the same port, and 2) matching traffic information that is mutually exclusive (non-intersecting) to the traffic information (e.g., packet) originating from the port. Merely for example, the optimizing module 354 may omit/strike the TCAM instructions for the flows of traffic information: 1) receiving traffic information from the port "2" and 2) matching traffic information (e.g., SRC IP 2.2.2.2) that is mutually exclusive (non-intersecting) to the traffic information (e.g., packet) originating from port "2" (e.g., SRC IP 1.1.1.1), as illustrated in FIG. 8. Specifically, the traffic information originating from port "2" (e.g., SRC IP 1.1.1.1) is the traffic information that is forwarded to the in-line service system 202 (e.g., "B") that is associated with port "2" (e.g., SRC IP 1.1.1.1).

Machine and Software Architecture

The modules, methods, engines, applications and so forth described in conjunction with FIGS. 1-10 are implemented in some embodiments in the context of multiple machines and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here, as those of skill in the art can readily understand how to implement the disclosure in different contexts from the disclosure contained herein.

Software Architecture

Figure 15:
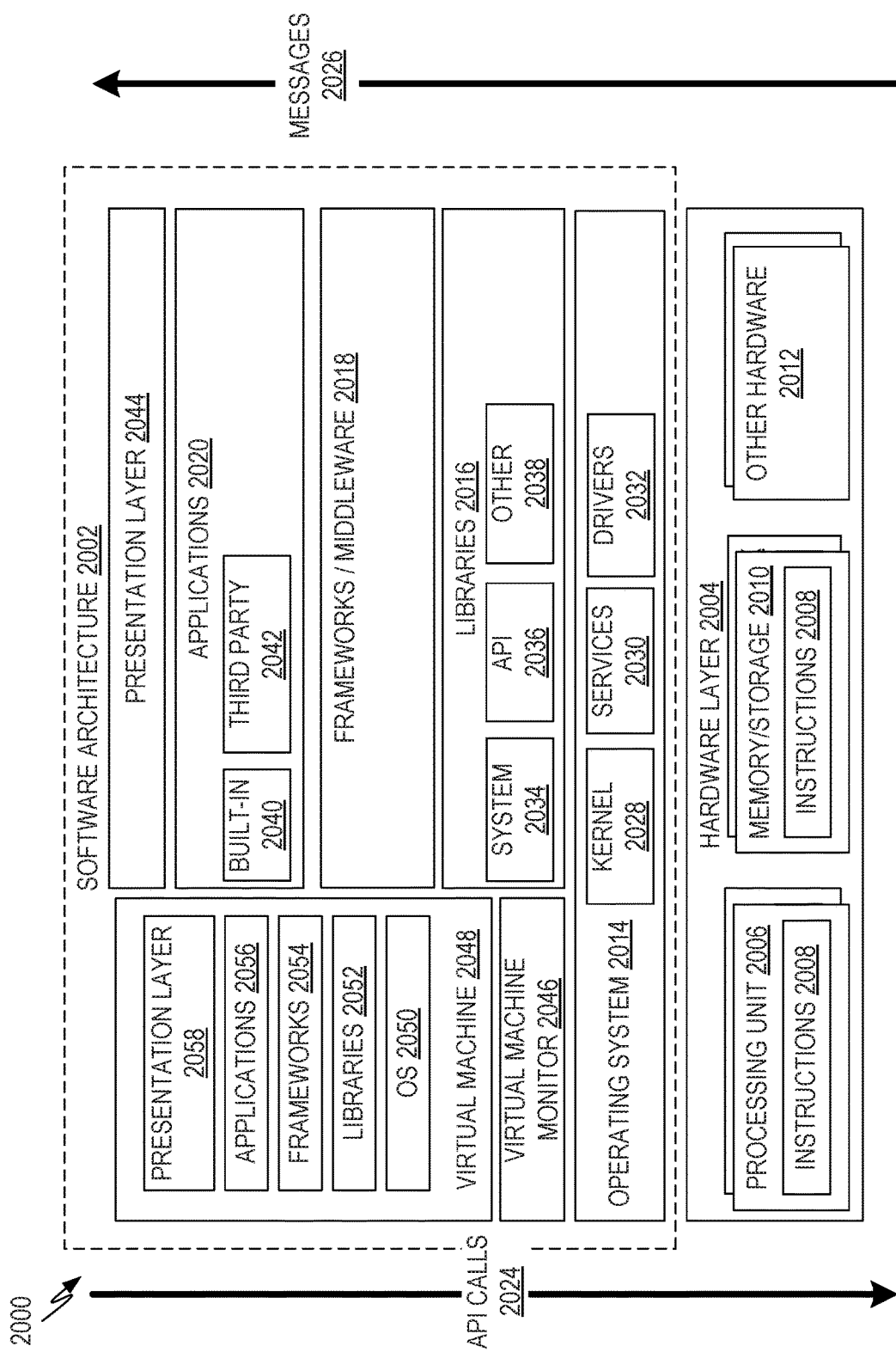
FIG. 15 is a block diagram illustrating a representative software architecture, which may be used in conjunction with various hardware architectures herein described.

FIG. 15 is a block diagram 2000 illustrating a representative software architecture 2002, which may be used in conjunction with various hardware architectures herein described. FIG. 15 is merely a non-limiting example of a software architecture 2002 and it will be appreciated that many other architectures may be implemented to facilitate the functionality described herein. The software architecture 2002 may be executing on hardware such as machine 2100 of FIG. 16 that includes, among other things, processors 2110, memory 2130, and I/O components 2150. Returning to FIG. 15, a representative hardware layer 2004 is illustrated and can represent, for example, the machine 2100 of FIG. 13. The representative hardware layer 2004 comprises one or more processing units 2006 having associated executable instructions 2008. Executable instructions 2008 represent the executable instructions of the software architecture 2002, including implementation of the methods, engines, modules and so forth of FIGS. 1-14. Hardware layer 2004 also includes memory and/or storage modules 2010, which also have executable instructions 2008. Hardware layer 2004 may also comprise other hardware, as indicated by 2012, which represents any other hardware of the hardware layer 2004, such as the other hardware 2012 illustrated as part of machine 2100.

In the example architecture of FIG. 15, the software 2002 may be conceptualized as a stack of layers where each layer provides particular functionality. For example, the software architecture 2002 may include layers such as an operating system 2014, libraries 2016, frameworks/middleware 2018, applications 2020 and presentation layer 2044. Operationally, the applications 2020 and/or other components within the layers may invoke application programming interface (API) calls 2024 through the software stack and receive a response, returned values, and so forth, illustrated as messages 2026 in response to the API calls 2024. The layers illustrated are representative in nature and not all software architectures have all layers. For example, some mobile or special purpose operating systems 2014 may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), advanced audio coding (AAC), adaptive-multi-rate audio codec (AMR), joint photography experts group (JPG), portable network graphics (PNG)), graphics libraries (e.g., an Open Graphics Library (OpenGL) framework that may be used to render 2D and 3D in a graphic content on a display), database libraries (e.g., Structured Query Language (SQL) SQLite that may provide various relational database functions), web libraries (e.g., WebKit that may provide web browsing functionality), and the like. The libraries 2016 may also include a wide variety of other libraries 2038 to provide many other APIs 2036 to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs 2036 that may be utilized by the applications 2020 and/or other software components/modules, some of which may be specific to a particular operating system 2014 or platform.

The applications 2020 include built-in applications 2040 and/or third party applications 2042. Examples of representative built-in applications 2040 may include, but are not limited to, a contacts application, a browser application, a book reader application, a location application, a media application, a messaging application, and/or a game application. Third party applications 2042 may include any of the built in applications 2040 as well as a broad assortment of other applications 2020. In a specific example, the third party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third party application 2042 may invoke the API calls 2024 provided by the mobile operating system such as operating system 2014 to facilitate functionality described herein.

The applications 2020 may utilize built in operating system 2014 functions (e.g., kernel 2028, services 2030 and/or drivers 2032), libraries 2016 (e.g., system 2034, APIs 2036, and other libraries 2038), frameworks/middleware 2018 to create user interfaces to interact with users of the system. Alternatively, or additionally, in some systems, interactions with a user may occur through a presentation layer, such as presentation layer 2044. In these systems, the application/module "logic" can be separated from the aspects of the application/module that interact with a user.

Some software architectures 2002 utilize virtual machines. In the example of FIG. 15, this is illustrated by virtual machine 2048. A virtual machine 2048 creates a software environment where applications/modules can execute as if they were executing on a hardware machine (such as the machine 2100 of FIG. 16, for example). A virtual machine 2048 is hosted by a host operating system (operating system 2014 in FIG. 15) and typically, although not always, has a virtual machine monitor 2046, which manages the operation of the virtual machine 2048 as well as the interface with the host operating system (i.e., operating system 2014). A software architecture 2002 executes within the virtual machine 2048 such as an operating system 2050, libraries 2052, frameworks/middleware 2054, applications 2056 and/or presentation layer 2058. These layers of software architecture 2002 executing within the virtual machine 2048 can be the same as corresponding layers previously described or may be different.

Example Machine Architecture and Machine-Readable Medium

Figure 16:
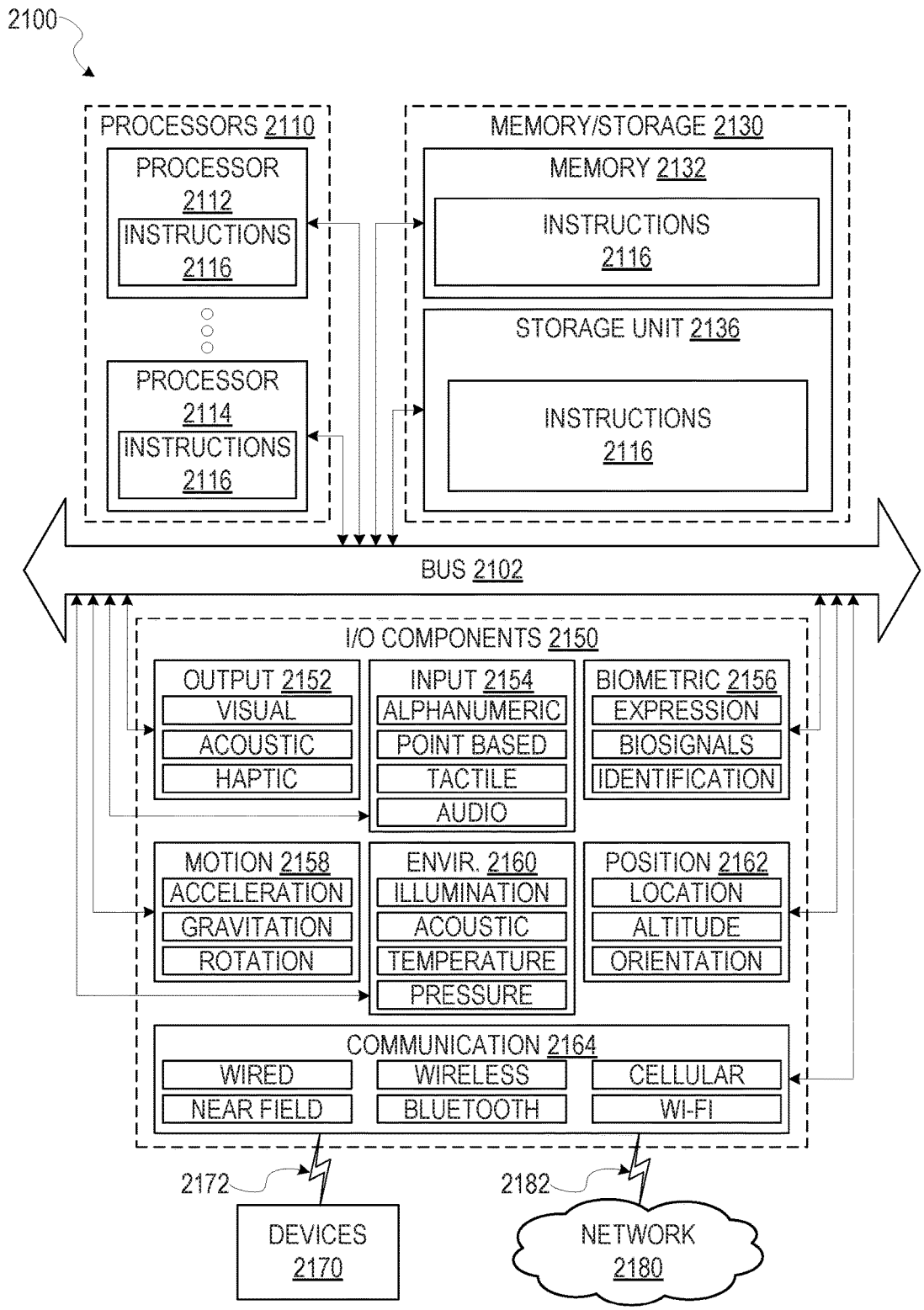
FIG. 16 is a block diagram illustrating components of a machine, according to some example embodiments.

FIG. 16 is a block diagram illustrating components of a machine 2100, according to some example embodiments, able to read instructions from a machine-readable medium (e.g., a machine-readable storage medium) and perform any one or more of the methodologies discussed herein. Specifically, FIG. 16 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example the instructions 2116 may cause the machine 2100 to execute the flow diagrams. Additionally, or alternatively, the instructions 2116 may implement the receiving module 302, processing module 304 including the TCAM 306 of FIG. 3A; the communication module 352 and the optimizing module 354 of FIG. 3B and so forth, including the modules, engines, and applications in this document. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 2112 and processor 2114 that may execute instructions 2116. The term "processor" is intended to include multi-core processors 2112 that may comprise two or more independent processors 2112 (sometimes referred to as "cores") that may execute instructions 2116 contemporaneously. Although FIG. 16 shows multiple processors 2112, the machine 2100 may include a single processor 2112 with a single core, a single processor 2112 with multiple cores (e.g., a multi-core processor), multiple processors 2112 with a single core, multiple processors 2112 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions 2116 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions 2116, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 16. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detects ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172 respectively. For example, the communication components 2164 may include a network interface component or other suitable device to interface with the network 2180. In further examples, communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a Universal Serial Bus (USB)).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet 208, a portion of the Internet 208, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "disclosure" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    at least one processor and executable instructions accessible on a computer-readable medium that, when executed, cause the at least one processor to perform operations comprising:
    generating a program comprised of a first plurality of instructions, the first plurality of instructions being utilized to process traffic information that is being received from a first network and communicated to a second network, the traffic information including a plurality of flows of traffic information that is associated with a plurality of in-line services that is associated with a plurality of in-line service systems that are logically interposed between the first network and the second network with a ternary content-addressable memory (TCAM) that executes the plurality of instructions to forward the plurality of flows of traffic information, the generating comprising:
    identifying in-line service systems, the plurality of in-line service systems including the in-line service systems, identifying a sequential order for the TCAM to process the in-line service systems,
    identifying matching values that respectively correspond to flows of traffic information, the plurality of flows of traffic information including the flows of traffic information,
    generating the first plurality of instructions, the first plurality of instructions including a second plurality of instructions that, when executed, cause the TCAM to respectively forward the flows of traffic information based on the sequential order and the matching values, the second plurality of instructions including a first instruction, a second instruction, and a third instruction, the first instruction including a first match part and a first action part, the second instruction including a second match part and a second action part, the third instruction including a third match part and a third action part, the flows of traffic information including a first flow of traffic information, the in-line service systems including a first inline service system, the first match part identifying the first flow of traffic information and the first action part causing the TCAM to forward the first flow of traffic information from the first network to the first service system, the flows of traffic information including a second flow of traffic information, the in-line service systems including a second in-line service system, the second match part identifying the second flow of traffic information and the second action part causing the TCAM to forward the second flow of traffic information from the first network to the second service system,
    identifying the second flow of traffic information is configured to match all traffic information,
    adding the second flow of traffic information by generating the second instruction and adding the second instruction to the program, the second match part identifying the second flow of traffic information as all traffic information,
    omitting TCAM instructions that are subsequent to the second instruction and that forward traffic information originating from the first network, the omitting being responsive to the identifying the second flow of traffic information is for all traffic information; and
    executing the first plurality of instructions with the TCAM.

2. The system of claim 1, wherein the generating the first plurality of instructions comprises:
    identifying the second flow of traffic information is configured to match hypertext transport protocol traffic information; and
    adding the second flow of traffic information by generating the second instruction and adding the second instruction to the program, the second match part to identify the second flow of traffic information as hypertext transport protocol traffic information.

3. The system of claim 1, wherein the plurality of flows of traffic information includes a third flow of traffic information, and wherein the third match part identifies the third flow of traffic information and the action part causes the TCAM to forward the third flow of traffic information from the first service system to the second service system.

4. The system of claim 3, wherein the generating the first plurality of instructions further comprises:
    identifying the third flow of traffic information does not intersect the first flow of traffic information.

5. The system of claim 4, wherein the generating the first plurality of instructions further comprises omitting the third instruction, the omitting the third instruction being responsive to the identifying the third flow of traffic information does not intersect the first flow of traffic information.

6. A method comprising:

generating a program comprised of a first plurality of instructions, the first plurality of instructions being utilized to process traffic information that is being received from a first network and communicated to a second network, the traffic information including a plurality of flows of traffic information that is associated with a plurality of in-line services that is associated with a plurality of in-line service systems that are logically interposed between the first network and the second network with a ternary content-addressable memory (TCAM) that executes the plurality of instructions to forward the plurality of flows of traffic information, the generating comprising:

identifying in-line service systems, the plurality of in-line service systems including the in-line service systems, identifying a sequential order for the TCAM to process the in-line service systems, identifying matching values that respectively correspond to flows of traffic information, the plurality of flows of traffic information including the flows of traffic information, generating the first plurality of instructions, the first plurality of instructions including a second plurality of instructions that, when executed, cause the TCAM to respectively forward the flows of traffic information based on the sequential order and the matching values, the second plurality of instructions including a first instruction, a second instruction, and a third instruction, the first instruction including a first match part and a first action part, the second instruction including a second match part and a second action part, the third instruction including a third match part and a third action part, the flows of traffic information including a first flow of traffic information, the in-line service systems including a first inline service system, the first match part identifying the first flow of traffic information and the first action part causing the TCAM to forward the first flow of traffic information from the first network to the first service system, the flows of traffic information including a second flow of traffic information, the in-line service systems including a second in-line service system, the second match part identifying the second flow of traffic information and the second action part causing the TCAM to forward the second flow of traffic information from the first network to the second service system, identifying the second flow of traffic information is configured to match all traffic information, adding the second flow of traffic information by generating the second instruction and adding the second instruction to the program, the second match part identifying the second flow of traffic information as all traffic information, omitting TCAM instructions that are subsequent to the second instruction and that forward traffic information originating from the first network, the omitting being responsive to the identifying the second flow of traffic information is for all traffic information; and executing the first plurality of instructions with the TCAM.

7. The method of claim 6, wherein the generating the first plurality of instructions comprises:

identifying the second flow of traffic information is configured to match hypertext transport protocol traffic information; and adding the second flow of traffic information by generating the second instruction and adding the second instruction to the program, the second match part to identify the second flow of traffic information as hypertext transport protocol traffic information.

8. The method of claim 6, wherein the plurality of flows of traffic information includes a third flow of traffic information, and wherein the third match part identifies the third flow of traffic information and the action part causes the TCAM to forward the third flow of traffic information from the first service system to the second service system.

9. The method of claim 8, wherein the generating the first plurality of instructions further comprises:

identifying the third flow of traffic information does not intersect the first flow of traffic information.

10. The method of claim 9, wherein the generating the first plurality of instructions further comprises omitting the third instruction, the omitting the third instruction being responsive to the identifying the third flow of traffic information does not intersect the first flow of traffic information.

11. A computer readable medium having no transitory signals and storing a set of instructions that, when executed on a processor, cause the processor to perform operations comprising:

generating a program comprised of a first plurality of instructions, the first plurality of instructions being utilized to process traffic information that is being received from a first network and communicated to a second network, the traffic information including a plurality of flows of traffic information that is associated with a plurality of in-line services that is associated with a plurality of in-line service systems that are logically interposed between the first network and the second network with a ternary content-addressable memory (TCAM) that executes the plurality of instructions to forward the plurality of flows of traffic information, the generating comprising:

identifying in-line service systems, the plurality of in-line service systems including the in-line service systems, identifying a sequential order for the TCAM to process the in-line service systems, identifying matching values that respectively correspond to flows of traffic information, the plurality of flows of traffic information including the flows of traffic information, generating the first plurality of instructions, the first plurality of instructions including a second plurality of instructions that, when executed, cause the TCAM to respectively forward the flows of traffic information based on the sequential order and the matching values, the second plurality of instructions including a first instruction, a second instruction, and a third instruction, the first instruction including a first match part and a first action part, the second instruction including a second match part and a second action part, the third instruction including a third match part and a third action part, the flows of traffic information including a first flow of traffic information, the in-line service systems including a first inline service system, the first match part identifying the first flow of traffic information and the first action part causing the TCAM to forward the first flow of traffic information from the first network to the first service system, the flows of traffic information including a second flow of traffic information, the in-line service systems including a second in-line service system, the second match part identifying the second flow of traffic information and the second action part causing the TCAM to forward the second flow of traffic information from the first network to the second service system, identifying the second flow of traffic information is configured to match all traffic information, adding the second flow of traffic information by generating the second instruction and adding the second instruction to the program, the second match part identifying the second flow of traffic information as all traffic information, omitting TCAM instructions that are subsequent to the second instruction and that forward traffic information originating from the first network, the omitting being responsive to the identifying the second flow of traffic information is for all traffic information; and executing the first plurality of instructions with the TCAM.

* * * * *